July 20, 1937.   L. E. LA BRIE, ET AL   2,087,382
BRAKE
Original Filed Sept. 11, 1929
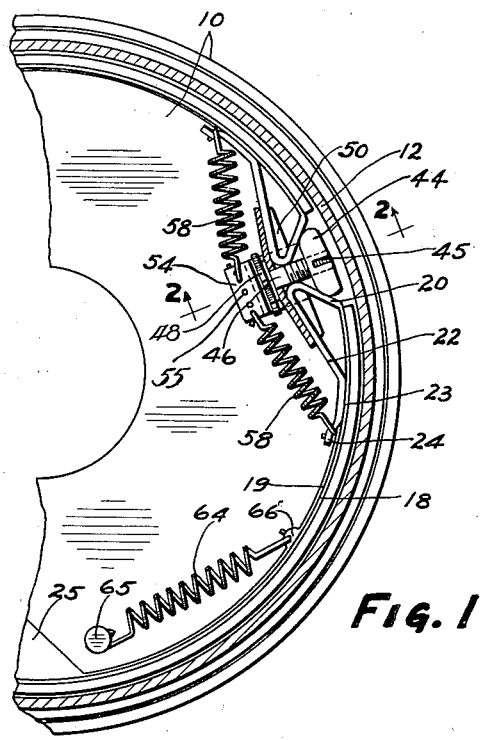
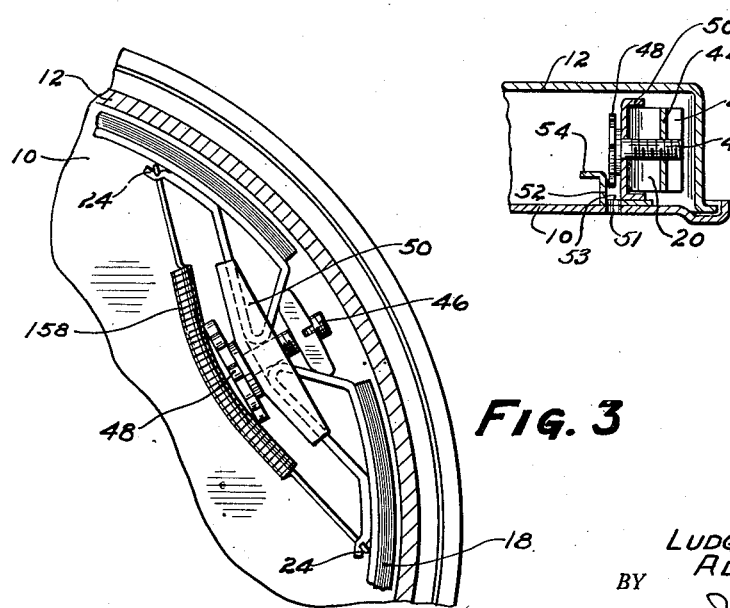
INVENTOR.
LUDGER E. LA BRIE
ADOLPH ROSNER
BY
ATTORNEY.

Patented July 20, 1937

2,087,382

UNITED STATES PATENT OFFICE 2,087,382

BRAKE

Ludger E. La Brie, Detroit, Mich., and Adolph Rosner, Rockton, Ill., assignors to Bendix Brake Company, South Bend, Ind., a corporation of Illinois Original application September 11, 1929, Serial No. 391,714. Divided and this application November 7, 1935, Serial No. 48,636

9 Claims. (Cl. 188—79.5)

This invention relates to brakes, and is illustrated as embodied in an internal expanding automobile brake.

An object of the invention is to provide simple and inexpensive means for adjusting the brake friction means for wear. In one desirable arrangement, two sections of a friction band or the like are formed with wedge surfaces, for example formed by return bent portions of the band, which are engaged by a wedge member which is movable, preferably in the plane of the brake, to wedge the two sections apart.

In the illustrated arrangements, the wedge member is threaded on a radially extending screw, preferably having a ratchet head engageable with a suitable tool for turning the screw to draw the wedge member radially inward. A spring tensioned between the sections may engage the ratchet head, yieldingly to lock the adjustment.

The above and other objects and features of the invention, including various novel combinations and desirable particular constructions, will be apparent from the following description of the illustrative embodiments shown in the accompanying drawing, in which:

Figure 1 is a partial section vertically through the brake, just inside the head of the brake drum, showing part of the brake friction means in side elevation;

Figure 2 is a partial radial section therethrough on the line 2—2 of Figure 1; and Figure 3 is a view corresponding to part of Figure 1, but showing a modified construction.

The illustrated brake comprises a support such as a backing plate 10, arranged at the open side of a rotatable brake drum 12, within which is arranged the brake friction means. The illustrated friction means consists of a friction band 18 formed in two sections connected by the novel wedge adjustment described below.

The applying means and the anchorage of the brake may be as fully described in our application No. 391,714, filed September 11, 1929, of which the present application is a division.

The sections of band 18 are arranged end to end, and are faced with brake lining. Each section has a rib 19, and is return bent at its end to provide inclined portions 20 and 22, the extreme ends of said return bent portions being secured to the inner face of the rim portions at 23 and thence outwardly projected to define lugs 24.

As explained above, the two sections of the band 18 are connected by a novel wedge adjustment, for the purpose of compensating for lining wear. To this end, there is provided a generally rectangularly shaped wedge member 44 slotted at 45 on its outer face, and threadedly mounted upon a radially extending screw 46.

The side wedging surfaces of the member 44 are preferably rounded, as shown in Figure 1 to insure at all times a line contact with the wedge surfaces 20 of the band sections.

The inner end of the screw 46 is provided with a ratchet head 48, the teeth of which are accessible from outside the backing plate through a hole 51 therein. The reaction of the wedge in forcing the band sections apart upon rotation of the screw is taken by a channel shaped stamping 50 sleeved on the screw 46 in abutment with the ratchet head 48, and enveloping the return bent portions 20—22.

The inner flange of the stamping 50 preferably contacts one flange of a generally Z-shaped fitting 52 superposed upon and preferably secured to the backing plate over the hole 51 therein, the fitting being provided with a correspondingly shaped registering hole 53.

The radially extending flange 54 of the fitting is preferably provided with a series of holes 55 to accommodate the hook-shaped ends of return springs 58 secured at their other ends to the lugs 24.

In operation, adjustment is effected by rotation of the ratchet head 48, by means such as a screw driver or other tool inserted by the operator from outside the backing plate. This forces the wedge 44 radially inward, forcing the sections of band 18 apart. This compensates for wear of the brake lining.

In the arrangement of Figure 3, springs 58 are replaced by a single spring 158 tensioned between the lugs 24 of the two sections of band 18, and overlying the ratchet head 48 to hold it yieldingly locked in adjusted position.

In either form, a spring 64 is secured at its lower end to the backing plate at 65 and to the lower section of the band at 66.

While two illustrative embodiments have been described in detail, it is not our intention to limit the scope of the invention to these particular embodiments, or otherwise than by the terms of the appended claims.

We claim:

1. In a brake, an annular expansible friction device comprising interchangeable segments with return bent portions and a wedge member, movable radially of the brake, contacting said portions.

2. In a brake, an annular expansible friction device comprising interchangeable segments with return bent portions forming inclined surfaces and a wedge member movable radially of the brake contacting said surfaces.

3. In a brake an annular expansible friction device comprising arcuate band segments formed of rectangular metal strips having their ends return bent and secured to their inner faces to form reinforced inclined surfaces, and a wedge member movable radially of the brake, contacting said surfaces.

4. In a brake an annular expansible friction device comprising arcuate band segments formed of rectangular metal strips having their ends return bent and secured to their inner faces to form reinforced inclined surfaces, and a wedge member movable radially of the brake, contacting said surfaces, said wedge member having rounded ends for line contact with said inclined surfaces.

5. A brake friction element comprising a band having one end bent inwardly to form an inclined surface and then secured back upon itself.

6. A brake friction element comprising a band having one end bent inwardly to form an inclined surface and then secured back upon itself, the extreme end of the return bent portion being formed into spring-engaging hook.

7. In a brake, an annular expansible friction device comprising rim portions having adjacent ends return bent to form inclined surfaces, a wedge member contacting said surfaces, a channel-shaped stamping enveloping said return bent ends, and a screw connecting the stamping and the wedge.

8. In a brake, an annular expansible friction device comprising rim portions having adjacent ends return bent to form inclined surfaces, a wedge member contacting said surfaces, a channel-shaped stamping enveloping said return bent ends, a screw connecting the stamping and the wedge, said screw having a head formed with a serrated edge for engagement with an adjusting tool, and a spring connecting said adjacent ends and engaging the serrated edge of the screw head to lock the screw in adjusted position.

9. In a brake, an annular expansible friction device comprising rim portions having adjacent ends return bent to form inclined surfaces, a wedge member contacting said surfaces, a channel-shaped stamping enveloping said return bent ends, a screw connecting the stamping and the wedge, and means for holding the screw in adjusted position.

LUDGER E. LA BRIE.
ADOLPH ROSNER.